Oct. 16, 1962 S. D. WILTSE 3,058,717
FLUID FLOW COUPLING AND CLOSURE DEVICES
Filed April 17, 1959
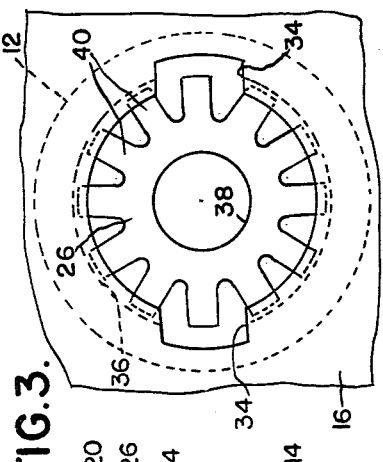
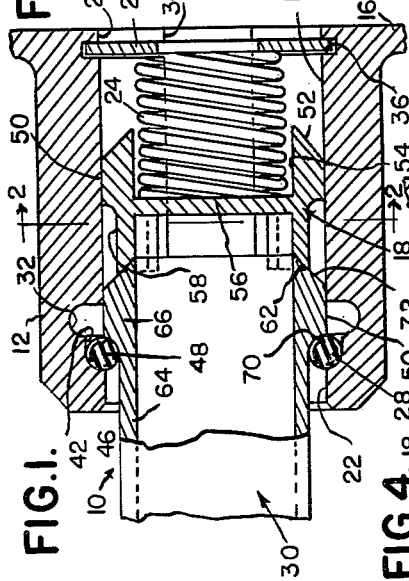
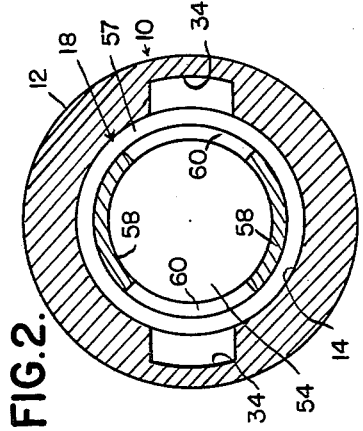
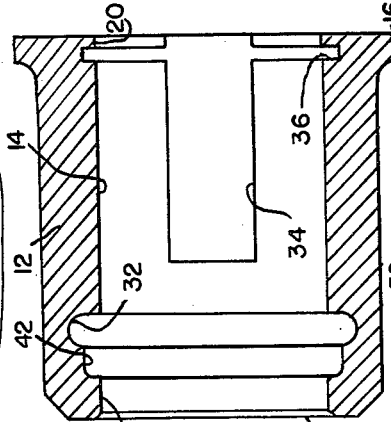
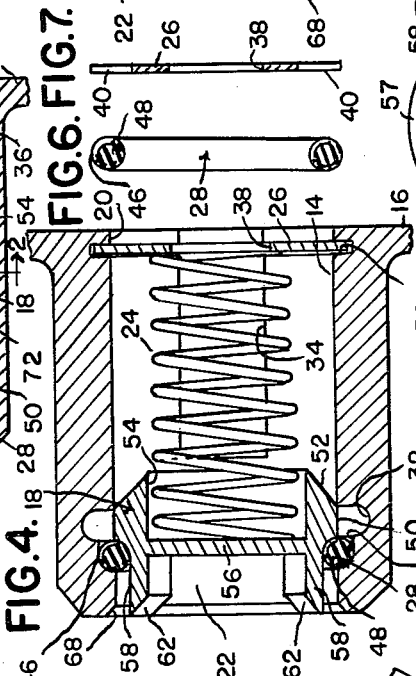
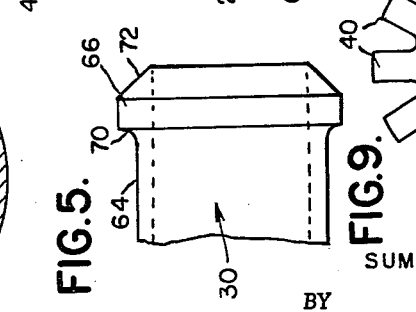
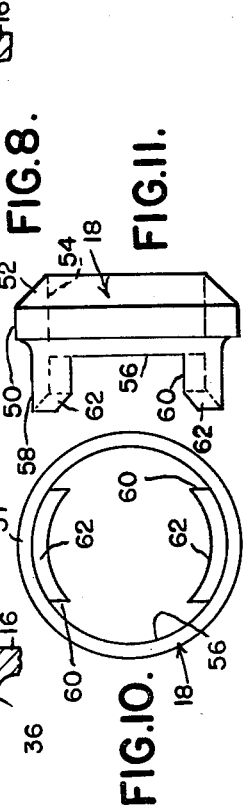
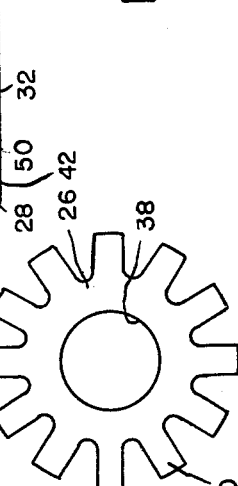
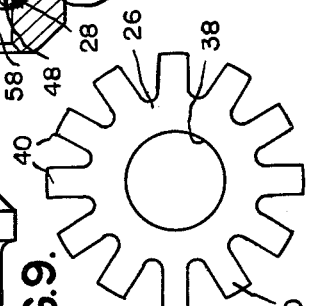
INVENTOR.
SUMNER D. WILTSE
BY
Whittemore, Hulbert & Belknap
ATTORNEYS United States Patent Office 3,058,717
Patented Oct. 16, 1962

3,058,717
FLUID FLOW COUPLING AND CLOSURE DEVICES
Sumner D. Wiltse, 4943 Ridgewood Ave., Detroit 4, Mich.
Filed Apr. 17, 1959, Ser. No. 807,050
4 Claims. (Cl. 251—149.6)

This invention relates to fluid flow coupling and closure devices in general, and more particularly to a combination fluid flow coupling and closure device.

Numerous different means have been proposed for coupling together two fluid flow conduits in aligned relation. There have also been many different forms of closure means proposed for use with fluid flow conduits and the like.

It is an object of this invention to disclose a new and novel form of fluid flow coupling device and one having closure means provided in combination therewith. The fluid flow coupling and closure device of this invention enables a source of fluid flow to be closed until such time as a connection is desired to be made thereto. And then, without any fuss or bother, the connection can be readily made for immediate use.

It is also an object of this invention to disclose a coupling and closure device of the type mentioned which may be provided within the wall of a fluid retaining tank, or the like. Accordingly, the fluid retained in the tank will be available with but a simple connection of a flow conduit thereto. At all other times the tank outlet will be closed and sealed.

Another object of this invention is to disclose a fluid flow coupling and closure device which is simple and inexpensive to manufacture, assemble, and install. The coupling and closure device of this invention may be made a part of a storage tank, as mentioned, or may be provided as a separate coupling member on the end of a flow line, or otherwise.

Still another object of this invention is to disclose a fluid flow coupling and closure device which is simple and compact in arrangement, comprises a minimum of parts, and has such parts readily accessible for inspection, replacement or repair.

These and other objects and advantages in the practice of this invention will be more fully appreciated upon a reading of the specification which follows, taken in conjunction with the accompanying drawings, wherein:

FIGURE 1 is a cross-sectional plan view of a coupling and closure device including the teachings of this invention, as disposed for use.

FIGURE 2 is a cross-sectional view of the coupling and closure device of FIGURE 1, as seen in the plane of line 2—2 thereon and looking in the direction of the arrows.

FIGURE 3 is an end view of the coupling and closure device of FIGURE 1 as viewed from the inlet side thereof.

FIGURE 4 is a cross-sectional plan view of the coupling and closure device of this invention, similar to FIGURE 1, and with the structure operation as a closure device.

FIGURE 5 is a fragmentary end section of the coupling member forming part of the disclosed structure.

FIGURE 6 is a cross sectional view of the sealing ring used in the practice of this invention.

FIGURE 7 is a cross-sectional view of the retaining plate for the biasing spring used in the practice of this invention.

FIGURE 8 is a cross-sectional view of the fluid flow passage or housing member of the disclosed coupling and closure device.

FIGURE 9 is an end or face view of the spring retaining place shown by FIGURE 7 and used in the practice of this invention.

FIGURE 10 is an end view of the closure member disclosed by this invention.

FIGURE 11 is a side or plan view of the closure member just mentioned.

Referring to the drawings in further detail:

As shown by FIGURE 1, the coupling and closure device 10 includes a tubular member 12 having a fluid flow passage 14 formed therethrough. The tubular member 12 may be formed as a part of a storage tank wall 16, as shown, or otherwise.

A valve member 18 is disposed within the fluid flow passage 14 and is reciprocal between the inlet and outlet ends 20 and 22 respectively, thereof. The inlet end 20 may also be referred to as the upstream end while the outlet end 20 may be referred to as the downstream end of the passage 14. A coiled compression spring 24 is also disposed in the passage 14 and is engaged with a retaining plate 26, at the inlet end 20 of the passage, to bias the valve member 18 towards the outlet end 22 of the fluid flow passage.

A sealing ring 28 is provided within the flow passage 14 near the outlet end 22 thereof. The sealing member 28 is disposed in a shoulder forming relation within the flow passage suitable for retaining and sealing engagement with a tubular member 30, as shown by FIGURE 1, or with the valve member 18 as shown by FIGURE 4. The sealing ring is radially expandable and is receivable within annular channel 32 formed next adjacent to the normal position of the sealing member, as will be described.

The tubular member 12 is shown alone by FIGURE 8. As mentioned, it includes a flow passage 14 formed therethrough. It also includes axially disposed channels or grooves 34, at the inlet end 20 of the flow passage, and in open communication with the flow passage 14. These grooves 34 are shown as disposed within the inner periphery of the flow passage 14 and on diametrically opposite sides thereof. As will be seen, these channels or grooves 34 provide bypassing passageways to permit fluid flow around the valve member 18 when located at the inlet end of passage 14; reference FIGURE 1.

The tubular member 12 also includes an annular groove 36 near the inlet end 20 thereof for receiving and retaining the spring base or seat member 26. Such member is shown by FIGURES 7 and 9 to comprise a flat circular plate or disc having a central opening 38 provided therethrough and radially disposed fingers 40. The radial fingers 40 are received in the groove 36 and incoming fluid may flow through the central opening 38 and/or between the finger parts.

A recess 42 is formed adjacent and in interconnected relation to the seal receiving channel 32 within the flow passage 14 and near the outlet end 22 thereof. The recess 42 is shallower than the channel 32. Both are formed to receive the sealing ring 28 therewithin. The channel 42 holds the sealing ring 28 in a shoulder forming relation within the fluid flow passage 14, as shown by both FIGURE 1 and FIGURE 4, while the channel 32 receives the sealing ring therewithin and beyond coupling or obstructing relation relative to the flow passage, as will be later described.

The sealing ring 28 may be of the commonly known O-ring type, or otherwise. The preferred type of ring seal is shown by FIGURE 6 to comprise a torous ring formed by a coil spring 46 embedded in a solid rubber or similar material 48 in the shape of a ring and with a circular cross-section.

The valve member 18 is best shown by FIGURES 10 and 11. It is cylindrical in shape and includes a peripheral head 50 which serves to guide the member in the course of reciprocation within the flow passage 14. It will be noted that the head 50 is of a width greater than the width of the seal receptive groove 32 near the outlet end 22 of the flow passage 14.

The upstream end of the valve member 18 is chamfered as at 52 and a spring receiving depression 54 is provided therein. The base or bottom of the spring seat depression 54 forms the closure wall 56 precluding fluid flow through the closure member.

The downstream end 58 of the valve member 18, as disposed for use, has a smaller outside diameter than the peripheral head 50. This forms a peripheral shoulder 57 therebetween.

Circumferential parts of the downstream end 58 of the valve member are relieved to form diametrically opposite openings 60. Such openings 60 are intended to be aligned with the channels or grooves 34 to permit more ready fluid flow through said channels or grooves 34 when the closure member is disposed at that end of the tubular member 12. The end faces of the remaining parts of the downstream valve member end 58 are chamfered as at 62. This affords an end face surface readily receptive of the end of the tubular member 30, as will be seen.

The tubular member 30 is essentially a fluid flow conduit and has a tubular portion 64 of smaller diameter than the enlarged head 66 provided at the end thereof. In the present instance, the enlarged head 66 is formed as part of the tubular member 30 and very much resembles the downstream end of the valve member 18. The enlarged head 66 has a larger outer diameter than the body of the flow conduit itself, and is substantially the size of the flow passage 14. Accordingly, it is readily receivable within the outlet end 22 of the flow passage 14. Such passage end may be chamfered slightly, as at 68, to facilitate insertion of the enlarged head 66 therein.

A sealing shoulder 70 is provided between the enlarged head 66 and the tubular portion 64 of the conduit part thereof. This sealing shoulder is similar in arrangement and disposition to the sealing shoulder 57 of the valve member 18.

The end face of the tubular member 30 is chamfered as at 72, and is the same as the chamfered end face 52 of the valve member 18. The end face 72 of the tubular member 30 is also formed to mate with the adjacent end face 62 of the valve member 18.

*Assembly and Use*

The tubular member 30 and the valve member 18 disclosed are assembled in the following manner:

The tubular member 12, in this instance, and as mentioned, is formed as a part of a storage tank wall 16. Further, it is formed to include the flow passage 14 therethrough, the annular channel 32, groove 36 and recess 42 therein, and has the outlet end 22 of the through flow passage chamfered slightly as at 68.

The retaining plate 26 is engaged within the groove 36 near the inlet end 20 of the flow passage 14. The fingers 40 of the spring base member 26 are initially engaged within the groove 36 by means of the channel or grooves 34.

The compression spring 24 is next disposed within the passage 14 and is seated against the retaining plate 26.

The valve member 18 is then placed in the passage 14 and has the spring 24 received within the spring seat depression 54 provided therein.

Thereafter the torous ring seal 28 is disposed within the flow passage 14 and within the shallow recess 42. This disposes the seal in a shoulder forming relation within the passage and such as causes the shoulder 57 of the valve member 18 to be engaged therewith.

If the sealing ring 28 is installed in the tubular member 12 before the valve member 18, the chamfered end 52 of the valve member will radially displace the seal into the annular channel 32 as it passes therethrough.

The structure thus far described is as shown by FIGURE 4.

The force of the spring 24 against the valve member 18, holds the peripheral shoulder 57 of the valve member in sealing engagement with the sealing ring 28. Accordingly, there is no chance of fluid flow past the valve member 18 of the assembly. It will be further appreciated that the sealing disposition of the valve member 18 is further enhanced by fluid pressure from behind.

To make use of the structure thus far described as a coupling, the tubular member 30 is used therewith.

As the enlarged head 66 of the tubular member 30 is disposed for insertion in the tubular member 12, the chamfered end face 72 thereof is engaged with the complementary chamfered end face 62 of the valve member 18. As the tubular member 30 is moved into the flow passage 14, the valve member is unseated from engagement with the seal 28. However, no appreciable fluid loss results since the O.D. of the valve member 18 closely approaches the I.D. of the flow passage 14.

As the valve member 18 is moved upstream in the flow passage 14, the chamfered end face 72 of the tubular member 30, outside of the part of the valve member which it engages, comes in contact with the seal 28. Accordingly, a fluid tight seal is re-formed almost immediately after the valve member is disengaged from the sealing member.

The chamfered shape of the end face 72 of the tubular member 30, upon engagement with the annular or torous ring seal 28, causes the sealing member to be moved upstream of the flow passage 14 and to be radially expanded into the receptive annular channel 32. The seal receptive channel 32 is in open communication and next adjacent to the normal seal receiving groove 42 for this expressed purpose.

Once the sealing ring 28 is expanded into the receptive channel 32, the enlarged head 66 of the tubular member 30 is free to pass on into the flow passage 14. In the course of doing so it causes the valve member 18 to be received within the area of the bypassing channels or grooves 34. This enables fluid to flow around and to circumvent the valve member 18. It will be appreciated however, that before the valve member 18 is received in such position the tubular member 30 is in fluid sealing engagement with the seal 28.

The enlarged head 66 of the tubular member 30 is extended into the fluid flow passage 14 until the shoulder 70 thereof passes the sealing ring 28. The sealing ring 28 thus contracts about the tubular portion 64 behind the shoulder 70. Thereafter, the inward force on the tubular member 30 is let up to allow the force of the compression spring 24 to take over. The compression spring 24 acts through the valve member 18 and on the end of the flow conduit 30 to push the flow conduit from the flow passage 14. The shoulder 70 of the tubular member 30, as it moves outwardly, carries the sealing ring 28 into its shoulder forming disposition within the annular recess 42. Thus a stop and sealing shoulder is provided to prevent inadvertent removal of the conduit member from the passage member and to form a fluid-tight coupling.

The course of fluid flow through the disclosed coupling assembly is via the opening 38 centrally in the retaining plate 26, or between the fingers 40 thereof, into the flow passage 14. From the passage 14 the fluid flows through the bypassing passageways formed by the channels or grooves 34 and around the valve member 18. The fluid then flows into the tubular member 30 from the ends of the channels or grooves 34 and through the openings 60 in the sides of the valve member.

The drawings and the foregoing specification constitute a description of the improved fluid flow coupling and closure devices in such full, clear, concise and exact terms as to enable any person skilled in the art to practice the invention, the scope of which is indicated by the appended claims.

What I claim as my invention is:

1. A fluid flow coupling and closure assembly comprising a tubular member having an annular recess formed in the inner surface thereof and having an annular channel of depth greater than said recess formed in said inner surface in axial communication with said recess, a resilient, expansible and contractable annular sealing member seated in said recess, said sealing member having a radial thickness greater than the depth of said recess so that said sealing member projects radially inwardly of said inner surface of said tubular member when seated in said recess as aforesaid, a valve member axially movable within said tubular member between a closed position engaging said annular sealing member to seal said tubular member against the flow of fluid across said valve member and an open position spaced axially inwardly from said closed position to open said tubular member to the flow of fluid across said valve member, said valve member being provided with a peripheral shoulder having sealing engagement with the sealing member when said valve member is in closed position and the sealing member is in said recess, a second tubular member adapted to be advanced into said first-mentioned tubular member axially inwardly to an operative position in coupled fluid communication therewith, said second tubular member being engageable with said valve member in end-to-end abutting relation during inward advance thereof to its operative position to move said valve member from closed to open position, said second tubular member having a head provided at its inner end with a radially outwardly facing cam surface engageable with said sealing member during the initial advance of said second tubular member to radially expand said sealing member into said channel so that said sealing member can clear said second tubular member during the further advance thereof, said second tubular member having a tubular portion of smaller diameter than said head at the outer end thereof, said expanded sealing member being adapted to contract about the tubular portion of said second tubular member when said second tubular member is advanced axially inwardly beyond said operative position far enough to register said tubular portion with said channel, said sealing member when contracted about said tubular portion of said second tubular member being movable axially outwardly with said second tubular member to engage said recess and thereby locate and determine said operative position of said second tubular member and seal the space between said tubular members.

2. The fluid flow coupling and closure assembly defined in claim 1 having an abutment carried by said first-mentioned tubular member axially inwardly of the open position of said valve member, and a spring compressed between said abutment and said valve member urging the latter axially outwardly toward the closed position thereof.

3. The fluid flow coupling and closure assembly defined in claim 1 wherein said sealing member is in the form of an O-ring of flexible, resilient, compressible material having a coil spring imbedded therein.

4. The fluid flow coupling and closure assembly defined in claim 1, wherein an apertured retaining plate extends transversely of said first mentioned tubular member and has its periphery anchored within an annular groove in said first mentioned tubular member axially inwardly of the open position of said valve member, a coil spring is compressed between said retaining plate and said valve member urging the latter axially outwardly toward the closed position thereof, said valve member has diametrically opposed openings at opposite sides thereof, and said first mentioned tubular member has axially extending channels in communication with said diametrically opposed openings and bypassing said valve member when the latter is in open position.

References Cited in the file of this patent
UNITED STATES PATENTS

| | | |
|---|---|---|
| 2,265,267 | Cowles | Dec. 9, 1941 |
| 2,318,965 | Parker et al. | May 11, 1943 |
| 2,322,877 | Parker | June 29, 1943 |
| 2,415,701 | Midgett | Feb. 11, 1947 |
| 2,527,005 | Glover | Oct. 24, 1950 |
| 2,614,866 | Ulrich | Oct. 21, 1952 |
| 2,646,994 | Scheiwer | July 28, 1953 |
| 2,708,589 | Masek | May 17, 1955 |
| 2,944,840 | Wiltse | July 12, 1960 |